April 19, 1966 C. L. McBRIDE, JR 3,246,806
PLANTER
Filed Sept. 2, 1964 2 Sheets-Sheet 1

INVENTOR
CHARLES L. McBRIDE, JR.
BY KARL W. FLOCKS
ATTORNEY

April 19, 1966     C. L. McBRIDE, JR     3,246,806

PLANTER

Filed Sept. 2, 1964     2 Sheets-Sheet 2

INVENTOR

CHARLES L. McBRIDE, JR.

BY KARL W. FLOCKS

ATTORNEY

United States Patent Office 3,246,806
Patented Apr. 19, 1966

3,246,806
PLANTER
Charles L. McBride, Jr., Old Court and Grasty Roads, Baltimore, Md.
Filed Sept. 2, 1964, Ser. No. 393,874
7 Claims. (Cl. 222—203)

The present invention relates to a planter and has particular reference to a bulb planter or planter of similar type irregularly shaped articles with said planter adapted to be mounted on a tractor.

An important application of the apparatus of the present invention is its use in planting of irregularly shaped bulbs.

The machine of the present invention enables a single operator to plant previously graded bulbs in an evenly spaced manner at a relatively high rate of speed.

Furthermore, in the present invention with the use of interchangeable feeder mechanisms different size bulbs may be accommodated for easy planting.

Basically the present invention provides a novel and improved mechanism and method of planting bulbs while insuring a continuous and even rate of planting and preventing damage to said bulbs.

These as well as further advantages which are inherent in the invention will become apparent from the following description, reference being had to the accompanying drawings, wherein.

Figure 1:
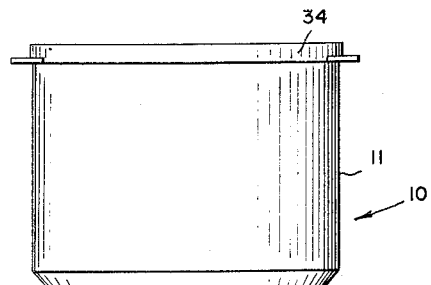
FIG. 1 is an elevation view of the apparatus of the present invention.

Referring first to FIG. 1, there is shown the planter 10 comprising a hopper 11 having a bevel gear 12 beneath the base 13 of the hopper. This bevel gear 12 is driven by drive pinion 14 mounted on a shaft 15 having sprocket 16 also mounted thereon. Sprocket 16 is driven by chain 17 connected to a rotating part of the tractor (not shown) upon which planter 10 is mounted.

Figure 2:
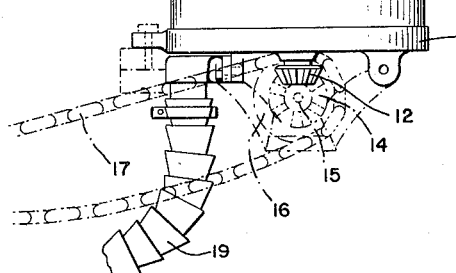
FIG. 2 is a vertical sectioned view of FIG. 1.
Figure 2:
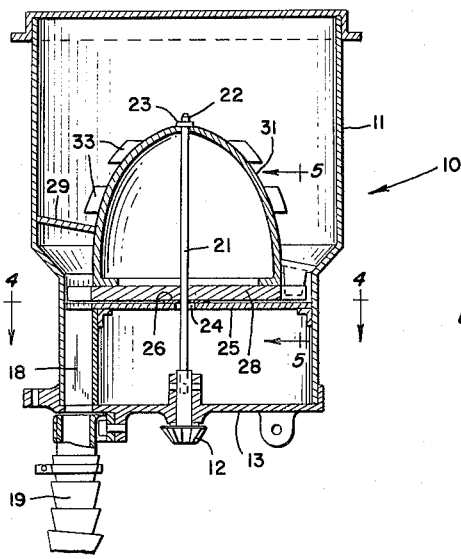
Figure 3:
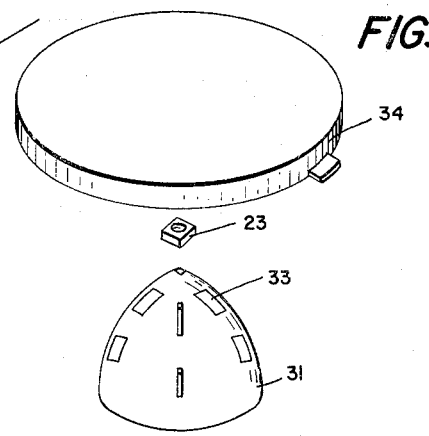
FIG. 3 is an exploded view in perspective of the planter of the present invention.

In FIGS. 2 and 3 the detailed inner construction of planter 10 is shown. Drive shaft 21 preferably of squared or rectangular construction is connected to bevel gear 12 at the lower end of the shaft and rotates therewith. The upper end 22 of drive shaft 21 is threaded to receive nut 23.

Drive shaft 21 extends upward from its connection with bevel gear 12 which is mounted to rotate in base 13 of hopper 11. Drive shaft 21 passes upward through a center opening in intermediate base 25 of hopper 11 and then through the center of washer 26. The center opening 24 in intermediate base 25 and the opening in washer 26 are of a size large enough to allow the drive shaft to pass through and to rotate in these openings without causing the rotation of either washer 26 or intermediate base 25. Drive shaft 21 then passes upward through a square or rectangular opening 27 in feeder 28. Center opening 27 in feeder 28 is of such size and shape as to cause the feeder to rotate with drive shaft 21. An inclined circular ramp 29 is attached to the sides of hopper 11 above feeder 28.

Resting on upper end 22 of drive shaft 21 at the point where the rectangular or squared surface of the drive shaft meets the threaded portion forming a shoulder 20 due to this change from squared or rectangular surface construction to circular construction, inside spacer 31 rests secured into its position by nut 23 screwed tightly down on drive shaft 21. Inside spacer 31 fits into circular opening 32 in circular ramp 29 and rests on the upper surface of feeder 28. Several vanes 33 are mounted on the surface of spacer 31 in a direction substantially perpendicular to the axis of rotation of drive shaft 21. The position of the lowest vane 33 on spacer 31 must be above the highest point on circular ramp 29 so that vanes 33 may be rotated without any interference from the surfaces of ramp 29. A cover 34 may be used on hopper 11 as shown in the figures.

Figure 4:
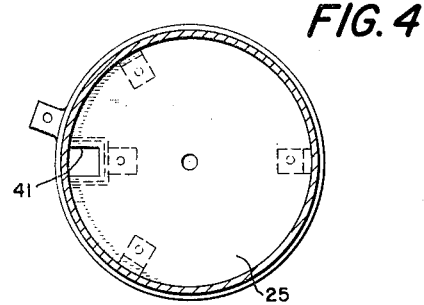
FIG. 4 is an elevation view along line 4—4 of FIG. 2.

In the operation of planter 10 bulbs 40 are placed in hopper 11 and may be piled to the full capacity of the said container. For best performance the bulbs used together should be of a single graded size. Usually bulbs are graded No. 1, No. 2, or No. 3 when they are of sizes up to 1⅞ inches, 1½ inches or 1¼ inches, respectively. Dependent upon the size of the bulbs to be planted feeder 28 may have a feeder 28′ substituted in the machine in planter 10 for accommodating smaller sized bulbs. The smaller the size of the bulbs the greater the number of slots in feeder 28. By the interchange of feeders smooth operation with the different sizes of bulbs may be accomplished. The single slot 41 in intermediate base 25 shown in FIGS. 3 and 4 should be larger than any size of slots 42 or 42′ contemplated for use on a feeder 28 or 28′ for best operation.

Figure 5:
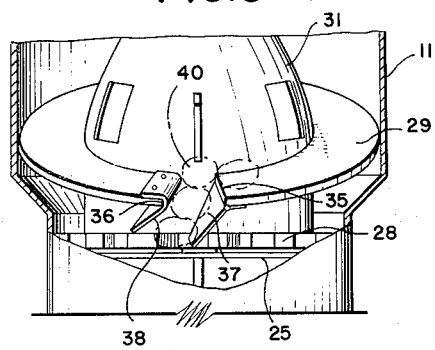
FIG. 5 is a partial perspective elevational view along line 5—5 in FIG. 2.
Figure 6:
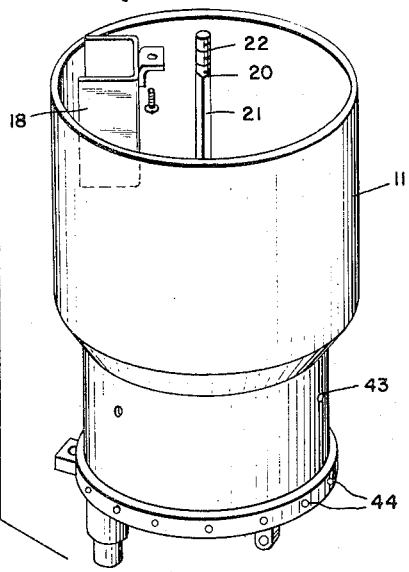
FIG. 6 is a second embodiment of the feeder of the present invention.
Figure 6:
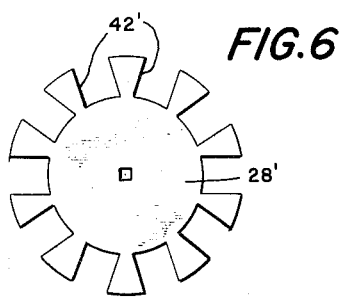

With bulbs 40 piled in hopper 11 the operation of the tractor upon which planter 10 is mounted causes movement of chain 17 which drives sprocket 16 and drive pinion 14 mounted on a common shaft 15. Bevel gear 12 driven by drive pinion 14 rotates drive shaft 21 which in turn rotates feeder 28 and spacer 31 with vanes 33 mounted thereon. Bulbs 40 move down inclined circular ramp 29 around the inside spacer 31. Any jamming of bulbs 40 on ramp 29 is broken up by vanes 33 during their rotation. As shown in FIG. 5, the bulbs 40 drop through the space formed by edges 35 and 36 in the break in the circular ring of ramp 29. Bulbs 40 in turn slide down a metal hinged member 37 into each of slots 42 in feeder 28. A flexible flap member 38 attached to an edge 36 opposite edge 35 to which hinged member 37 is attached assures that only one bulb will fall into each of slots 42. With the arrangement of hinged member 37 and flexible flap member 38 as shown in FIG. 5 it is necessary that feeder 28 rotates in a clockwise direction. Feeder 28 then continues its rotation in a clockwise direction with a bulb 40 in each of its slots 42 until slot 42 passes over slot 41 in intermediate base 25. Upon coincidence of slot 42 with slot 41 the bulb is allowed to drop through both slots into spout 18 and then through flexible tube 19. Flexible tube 19 extends down close to ground level and directs the bulb into the hole or trench prepared for it. If for some reason, a bulb is not dropped through the slots when they coincide and continues to be carried by feeder 28 in its rotation movement, the metal hinged member 37 will be raised when slot 42 carrying bulb 40 passes beneath it and thereby prevents a second bulb 40 from falling upon and into slot 42. Hinged member 37 also serves to push a bulb 40 into a slot 42 if such bulb has been deposited on feeder 28 between the slots and therefore did not have the opportunity to pass between slots 42 and 41 into spout 18. Flexible flap member 38 will pass over a bulb 40 in slot 42 and will push a second bulb 40 which may attempt to land in the same slot away from said slot, either into a successive slot 42 or into a position between said slots where it will be taken care of later by hinged member 37. If it is desired, an additional flexible flap member may be placed on the under surface and depending from circular ramp 29 at an intermediate point in the path of rotation of slots 42 of feeder 28 thereunder and preferably at a point beyond where the slots 41 and 42 coincide. This will further assure the function performed by hinged member 37 being smoothly performed.

Bolts 43 and 44 are used to hold in place the intermediate base 25 and bottom 13 of hopper 11 respectively. Other arrangements of holding the intermediate base and bottom of the hopper in position may be used as long as such arrangement allows easy access to parts inside the hopper 11. Such access is necessary for changing feeder 28 when different grade sizes of bulbs are used and also for purposes of cleaning said hopper.

It will be obvious to those skilled in the art that various changes may be made without departing from the scope of the invention and therefore the invention is not limited to what is shown in the drawings and described in the specification but only as indicated in the appended claims.

What is claimed is:

1. A bulb planter for mounting on a tractor comprising a hopper to contain the bulbs,
a drive shaft vertically mounted in said hopper,
means to rotate said drive shaft in conjunction with the travel of the tractor,
a feeder member mounted for rotation with said drive shaft and having a plurality of slots circumferentially spaced on said member,
a spacer member mounted above said feeder member on said drive shaft for rotation therewith,
an inclined circular ramp having a break in its circular form and mounted in said hopper around said spacer member and above said feeder member,
a rigid hinged member mounted for hinging action on an edge of said break in the circular form of said inclined circular ramp,
and a base member mounted in said hopper below said feeder member in a fixed position and having a slot therein located to coincide with successive individual slots of said feeder member during rotation of said feeder member, whereby bulbs which pass through the slot in said base member are ejected from said hopper.

2. The bulb planter of claim 1, further characterized by
said rigid hinged member extending downward toward said feeder member and hinged in a direction to be raised when encountering a bulb in said feeder member.

3. The bulb planter of claim 2, further characterized by
a flexible member attaching to the adjacent facing edge of said break in the circular form of said inclined circular ramp from which said hinged member is attached,
said flexible member extending downward toward said feeder member.

4. The bulb planter of claim 3, further characterized by vanes attached on said spacer member and projecting therefrom,
said vanes located with all points thereon above the highest point of elevation of said circular ramp.

5. The bulb planter of claim 3, further characterized by said feeder member being interchangeable with a feeder member having a different number and different size of slots.

6. The bulb planter of claim 5, further characterized by said slot in said base member being larger than any of said slots in any of said feeder members.

7. A bulb planter for mounting on a tractor comprising a hopper to contain the bulbs,
a gear means mounted on said hopper, means to rotate said gear means in conjunction with the travel of the tractor,
a drive shaft mounted to rotate with said gear means,
a feeder member mounted for rotation with said drive shaft and having a plurality of slots circumferentially spaced on said member,
a spacer member mounted above said feeder member on said drive shaft for rotation therewith,
an inclined circular ramp having a break in it circular form and mounted in said hopper around said spacer member and above said feeder member,
a rigid hinged member mounted on an edge of said break in the circular form of said inclined circular ramp extending downward toward said feeder member and hinged in a direction to be raised when encountering a bulb in said feeder member,
a flexible member attached to the adjacent facing edge of said break in the circular form of said inclined circular ramp opposite said hinged member and extending downward toward said feeder member,
a base member mounted in said hopper below said feeder member in a fixed position and having a slot therein located to coincide with successive individual slots of said feeder member during rotation of said feeder member,
and a flexible tubing attached to said hopper and extending downward adjacent to the ground surface in a position to receive bulbs which pass through the slot in said base member.

References Cited by the Examiner

UNITED STATES PATENTS

| 769,137 | 8/1904 | Heylman | 221—265 |
| 997,367 | 7/1911 | Bruhn | 222—270 |
| 1,179,254 | 4/1916 | White | 221—265 |
| 1,184,074 | 5/1916 | Clark | 221—265 |
| 1,792,763 | 2/1931 | Ryan | 221—265 |
| 2,880,906 | 4/1959 | Probasco | 221—265 |

FOREIGN PATENTS 863,876   4/1941   France.

LOUIS J. DEMBO, *Primary Examiner.*

WALTER SOBIN, *Examiner.*